April 13, 1965  AKIRA OKAYA  3,177,770
LIGHT MODULATION BY MICROWAVES
Filed Oct. 17, 1961
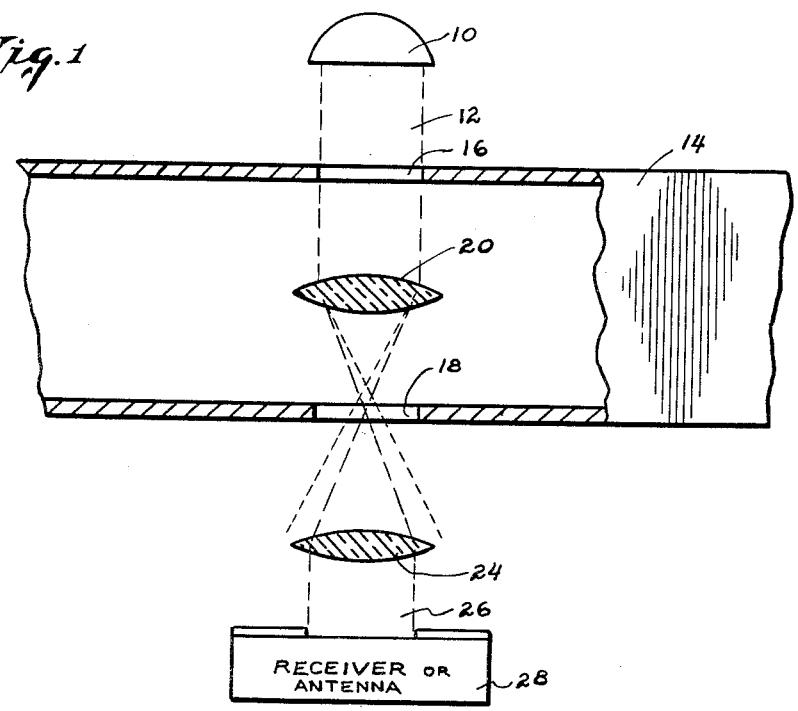
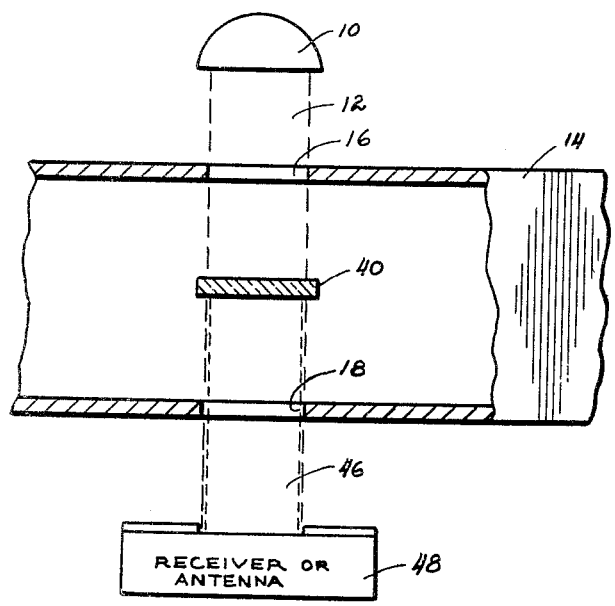
INVENTOR.
Akira Okaya
BY Emery, Whittemore
Sandoe + Graham
ATTORNEYS

3,177,770
LIGHT MODULATION BY MICROWAVES
Akira Okaya, % J. D. Herrebaudt, Lakeview Road,
Ossining, N.Y.
Filed Oct. 17, 1961, Ser. No. 145,724
8 Claims. (Cl. 88—61)

This invention relates to the modulating of a light beam by the microwaves.

It is an object of the invention to provide an improved apparatus for modulating the amplitude and/or frequency of a light beam by the energy of microwaves.

The term "microwaves" is used herein to designate waves within the wave length range from 30 centimeters to 0.05 millimeter.

The invention passes a light beam through a lens and utilizes the microwaves to produce a resonance that changes the index of refraction of the lens. Depending upon the lens construction and the apparatus to which the refracted light is supplied, the resonance produces a modulation of the amplitude and/or the frequency of the light.

The term "light," as used herein, is not limited to visible light and includes infra-red and ultra-violet light.

Other objects, features and advantages of the invention will appear or be pointed out as the description proceeds.

In the drawing, forming a part hereof, in which like reference characters indicate corresponding parts in all the views;

FIGURE 1 is a diagrammatic view, mostly in section, showing apparatus for producing a light beam with amplitude modulations; and FIGURE 2 is a diagrammatic view, similar to FIGURE 1, showing apparatus for producing frequency modulations of the light beam.

In FIGURE 1, monochromatic and preferably coherent light from a source 10 is projected as a parallel beam 12 through a wave guide 14 having aligned openings 16 and 18 in opposite walls of the wave guide 14.

Within the wave guide there is an optical lens 20 made of electric sensitive material which is transparent to the particular wave length of light supplied by the light source 10. The lens material must be a dielectric capable of dielectric resonance when exposed to microwaves, and it is preferably a resonator having non-linear characteristics for electromagnetic waves. The lens should be made of material having a power factor less than 0.01 and a dielectric constant larger than 5, and preferably a Q value larger than 100. It will be evident that the resonator cannot be made of metal. It must be a solid, but there are numerous solids having the required high dielectric constant and small dielectric loss.

The relation of power factor to dielectric constant is expressed in the equation:

tan $\delta$ = (Power factor) = conductivity/dielectric
constant $\times$ angular frequency of the microwave The angular frequency = $2\pi f$ and $f = c/\lambda$ where $c$ = velocity of light
$\lambda$ = wave length of microwave For purposes of this invention, the dielectric constant is related to the index of refraction, and the material used for the lens is transparent to the wave length of the beam 12. Further information on dielectric resonance is contained in my earlier patent application Ser. No. 3,872 filed January 21, 1960, for Dielectric Microwave Resonator.

The lens 20 produces a convergence of the light beam 12. The focal point is a function of the shape of the lens 20 and the index of refraction of the material of the lens. The important principle of this invention is that the microwaves in the wave guide 14 cause a change in the dielectric constant of the lens.

When the lens 20 has a particular dielectric constant, the rays of the light beam 12 will converge, as indicated by the dash lines in FIGURE 1, and pass to a condenser 24 which returns the rays to parallel relation so that they continue as a parallel light beam 26 beyond the wave guide and to a receiver or antenna 28 having detector equipment responsive to the light beam and to variations in the amplitude of the light.

The microwaves in the wave guide 14 change the dielectric constant of the lens 20, the rays of the light beam 12 converge more sharply and then diverge to cover a larger field by the time they reach the condenser 24, as indicated by the dotted lines in FIGURE 1. The condenser 24 collects proportionately less of the light as the focal length of the lens becomes shorter and thus the amplitude of the light waves reaching the receiver 28 decreases in accordance with the changes in the value of the dielectric constant of the lens. This produces a modulation of the light beam with the frequency of the modulation equal to that of the waves in the wave guide.

While the modulation of the light beams by the shape resonance of the lens is an amplitude modulation, the frequency of this modulation can be changed by changing the frequency of the microwaves in the wave guide 14.

FIGURE 2 shows a modification of the invention for obtaining frequency modulation instead of amplitude modulation. In the apparatus shown in FIGURE 2, a dielectric plate 40 is made of the same material as the lens 20 of FIGURE 1, and the plate 40 resonates with shape resonance in response to microwaves in the wave guide 14.

The light passing through the plate 40 has a phase shift $\phi(0)$ when there is no microwave power input to the waveguide. When there are microwaves in the wave guide at the resonant frequency of the plate 40, then the phase shift of the light passing through the plate 40 changes from $\phi(0)$ to $\phi(E)$ as the result of change in the refractive index of the material of the plate 40. There the effect of change in the dielectric constant of the plate 40 is to modulate the light beam with a phase or frequency modulation. When using visible light and monochromatic light, the frequency change is not sufficient to produce a change in the color that is visible to the unaided eye, but the frequency modulation is easily detected by the receiver 48.

The frequency of the modulation of the light beam 46 depends upon the frequency of the microwaves in the wave guide 14. It will be evident that the light beam 46 can be passed through lens as in FIGURE 1 to impose an amplitude modulation on the beam that already has a frequency modulation, or vice versa. The modulations, changes in modulations, and various combinations of characteristics of the transmitted beams 26 or 46 can be used as signals for various purposes, but the construction of the receivers 28 and 48, and the effect of the signals on the receivers, is not a part of this invention.

The invention has been illustrated and described, but changes and modifications can be made and features can be used in different combinations without departing from the invention as defined in the claims.

What is claimed is:

1. Apparatus for modulating a light beam including:
   (a) wave guide having walls at opposite sides thereof and with aligned openings in said walls for the passage of a light beam transversely through the wave guide,
   (b) a source of light outside of the wave guide and in line with one of the openings, (c) a solid dielectric resonator including a lens in the wave guide in the path of light from said source, (d) the lens being spaced from all sides of the wave guide and being made of material through which at least a portion of light from said source can pass, and resonant to electromagnetic waves which can be propagated in the wave guide, (e) the material of the lens having a power factor less than 0.01, a dielectric constant greater than 5, and a Q value larger than 100, and (f) a light-responsive receiver outside of the wave guide in position to receive light that passes from said source through the lens and through the opening in the wall of the wave guide between the lens and receiver.

2. Apparatus for modulating light waves including a lens through which the light passes and by which said light is refracted, the lens being of solid dielectric material transparent to the light waves and having at least one curved surface which produces differences in thickness of the lens across its surface, a receiver in the path of the refracted light, and means for changing the index of refraction of the lens to change the amount of light reaching said receiver, the lens being located within an electromagnetic propagating wave guide, and the electromagnetic microwaves so propagated constituting the means for changing the index of refraction of the lens.

3. The apparatus described in claim 2, and in which there is a source of light at one side of the wave guide and there are aligned optical openings through opposite sides of the wave guide in the path of the light from said source, the receiver being located on the opposite side of the wave guide from the source of light.

4. Apparatus for modulating light waves including a lens through which the light passes and by which said light is refracted, the lens being of solid dielectric material transparent to the light waves and having at least one curved surface which produces difference in thickness of the lens across its surface, the lens having a dielectric resonance to electromagnetic waves of a selected frequency, means for directing the electromagnetic waves on to the lens, a receiver in the path of the refracted light, and means for changing the index of refraction of the lens to change the amount of light reaching said receiver, the lens changing the cross section of the beam to change the intensity of the light across said cross section of the beam, and the receiver including means for accepting a predetermined and uniform cross section of the light beam whereby increases in the cross section of the light beam beyond said predetermined and uniform cross section reduces the amount of the light reaching said receiver.

5. Apparatus for modulating a light beam, including a source of light, a receiver to which the light is supplied, a space between the source and the receiver and through which the light beam passes, and a transparent solid dielectric resonator within the space and in the path of the light, said dielectric resonator being resonant to electromagnetic waves of a selected frequency for changing the index of refraction of the resonator, and means for directing electromagnetic waves on to the resonator.

6. The apparatus described in claim 5, and in which the means for directing electromagnetic waves on to the resonator is in a wave guide for microwaves of the selected frequency and the guide has an optical opening through which light passes in a direction transverse of the longitudinal extent of the wave guide.

7. The apparatus described in claim 5, and in which the dielectric resonator is a lens.

8. The apparatus described in claim 5, and in which there are two lenses through which the light passes, one of which is the dielectric resonator and one of which compensates for at least a part of the refraction of the other.

References Cited by the Examiner
UNITED STATES PATENTS

| | | | |
|---|---|---|---|
| 2,451,732 | 10/48 | Hershberger | 88—61 |
| 2,913,665 | 11/59 | Bromke | 88—61 X |
| 2,974,568 | 3/61 | Dillon | 88—61 |
| 3,096,494 | 7/63 | Jacobs et al. | 333—98 X |

JEWELL H. PEDERSEN, *Primary Examiner.*